US005430432A

United States Patent [19]

Camhi et al.

[11] Patent Number: 5,430,432

[45] Date of Patent: Jul. 4, 1995

[54] AUTOMOTIVE WARNING AND RECORDING SYSTEM

[76] Inventors: Elie Camhi, 131 Country Ridge Rd., Scarsdale, N.Y. 10583; Lawrence S. Kamhi, 30 Saddleview Ct., Fairfield, Conn. 06432

[21] Appl. No.: 278,991

[22] Filed: Jul. 22, 1994

Related U.S. Application Data

[63] Continuation of Ser. No. 992,246, Dec. 14, 1992, abandoned.

[51] Int. Cl.[6] ........ B60Q 1/00

[52] U.S. Cl. ........ 340/438; 340/439; 340/441; 340/459; 364/424.04; 364/551.01; 307/10.1; 180/171

[58] Field of Search ........ 340/438, 439, 441, 436, 340/459, 425.5, 457.4; 364/434, 424.1, 424.03, 424.04, 551.01; 307/10.1; 180/171

[56] References Cited

U.S. PATENT DOCUMENTS

| | | | |
|---|---|---|---|
| 3,885,324 | 5/1975 | Davenport et al. | 340/441 |
| 4,236,142 | 11/1980 | Lindsey | 340/441 |
| 4,344,136 | 8/1982 | Panik | 340/459 |
| 4,638,289 | 1/1987 | Zottnik | 340/438 |
| 4,939,652 | 7/1990 | Steiner | 340/438 |
| 5,006,829 | 4/1991 | Miyamoto et al. | 340/459 |
| 5,173,856 | 12/1992 | Purnell et al. | 340/439 |

*Primary Examiner*—Brent Swarthout
*Assistant Examiner*—Nina Tong
*Attorney, Agent, or Firm*—Ike Aruti

[57] ABSTRACT

An automotive unsafe condition recorder is provided having one or more automotive condition sensors coupled to the input of a timer equipped processor. An indicator for alerting the operator is coupled to an output of the processor, which the processor energizes in response to a signal level from the sensor indicating the existence of a predetermined unsafe operating condition. If the unsafe operating condition is not corrected within a predetermined time, the processor transmits information pertaining to the unsafe condition to a storage unit, which accumulates the information for later review.

7 Claims, 2 Drawing Sheets

AUTOMOTIVE WARNING AND RECORDING SYSTEM

CROSS REFERENCE TO RELATED APPLICATION

This application is a Continuation of applicant's co pending application Ser. No. 07/992,246 filed Dec. 14, 1992, now abandoned.

FIELD OF THE INVENTION

The present invention relates to warning systems and mobile data recorders, and more particularly, an apparatus and method for the monitoring, indicating and selective recording of automotive data associated with unsafe automotive driving conditions.

BACKGROUND OF THE INVENTION

Mobile data recorders, such as aviation type flight recorders, are well known. These devices are commonly used to make continuous recordings of the conditions which exist during and relating to aircraft operation. The devices are typically multiple input units wherein a plurality of input signals are recorded. The inputs are usually coupled to a plurality of input signal sending devices, such as sensors for airspeed, landing gear positions, control surface positions, attitude, altitude, engine operating parameters, as well as the positions of the controls for the aircraft such as throttle, brakes, and the like. These devices are typically housed in a crash resistant structure, and upon a crash, the recordings of parameters which existed immediately prior to the crash are preserved for later review and analysis.

This information can be used to virtually recreate situations which have occurred. The information can then be used by repair and maintenance personnel, airline officials for evaluation of the craft and crew, regulatory authorities for incident or crash analysis, and insurance companies for liability and premium determinations.

In an automotive context, devices which identify and alert drivers to the existence of specific conditions are also well known. These are often in the form of simple gauges or indicator lights, buzzers and the like which are used to inform the operator of excessive or insufficient operating parameters, or even potentially unsafe conditions. These include excessive vehicle speed, engine speed and temperature, insufficient coolant, oil and fuel levels, low oil pressure or electrical system voltage, unbuckled seat belts, and the like. More technically sophisticated devices, such as automotive computers, are able to monitor and record diagnostic information for future reference and repair of systems controlled by the computer, such as engines and anti lock brake systems.

While these systems have been designed to notify operators of specific conditions or to record conditions for future reference, it would be desirable to have a variation upon a combination of these systems. Such a device would not only inform operators of unsafe conditions, the recorded information would improve authorities' ability to perform accident reconstruction, and would enable vehicle owners and insurance companies to evaluate the driving habits of vehicle operators. In such an application, continuous recording of information would be unnecessary and wasteful of storage resources, particularly since it is the information pertaining to the prevalent conditions during unsafe operation of the vehicle which is of most interest.

Unfortunately, an automotive unsafe condition recorder would likely be found objectionable by vehicle owners and drivers, not only because of the increased cost of the vehicle for the additional equipment, but because of the "Big Brother" like nature of having an operator's every momentary inattention or indiscretion preserved for insurance company scrutiny.

Many otherwise safe drivers will occasionally do something which could be considered unsafe, such as momentarily forgetting to latch their seat belt, or even exceed the speed limits for short periods of time, for example to complete a passing maneuver, or because they are inattentive to their speedometers while keeping pace with cars around them, or when the road gradually changes to a more downhill attitude. An automotive unsafe condition recorder would more likely be acceptable to the majority of vehicle drivers and owners if these momentary lapses in law obedience or safety could be screened from the recording process. The device would likely be even more acceptable if it would give warning to the operator of the existence of an unsafe condition, and a reasonable opportunity to correct the situation before beginning to record the occurrence.

The benefits of such a device would be multiple. Monitored drivers would be motivated to drive more safely by the reward of lower insurance premiums, which could be lowered further if they prove themselves responsible. Insurance companies could eliminate persistent speeders and unsafe drivers, or increase their premiums accordingly. Authorities could more accurately reconstruct accidents. Fleet owners of vehicles, such as busses, trucks and taxis could substantially reduce their major operating expense of insurance, and become more competitive in the marketplace by offering their services at lower rates. The public would ultimately benefit from lowered prices for taxi and bus services and truck shipped goods, as well as the reduced number of unsafe drivers on the road. People would be able to evaluate the safe driving habits of others using their vehicles, such as parents having young or new drivers in the family.

Accordingly, a need exists for a device which can monitor vehicle operating parameters and alert the operator to predetermined unsafe conditions, allow a short time for correction of those conditions, and if uncorrected in that time, record the incident for later review by the appropriate parties.

OBJECTS AND ADVANTAGES

It is therefore an object of the instant invention to provide a device which alerts a vehicle operator to the existence of a predefined unsafe driving condition, if and when such a condition should occur.

It is another object of the present invention to provide a device to alert a driver upon the existence of an unsafe driving condition, and to make a recording of the event for future reference if the condition is not corrected within a reasonable time.

Still another object of the present invention to provide a device which will further record additional vehicle operating parameters when an unsafe operating condition has occurred and the operator has not corrected the situation within a reasonable time.

It is yet another object of the present invention to provide a device by which insurance companies may identify vehicles they insure which are operated under unsafe conditions or at excessive speed with unacceptable frequency.

It is still another object of the present invention to provide a device which will motivate drivers to avoid unsafe operating conditions such as unsafe speed.

Yet another object of the present invention to provide a device which enables insurance companies to attract clients whose vehicles are operated in a safe and responsible manner.

A further object of the present invention to provide a device which improves the accuracy with which accidents can be analyzed.

Another object of the present invention is to provide a device which enables the storage and retrieval of information relating to the unsafe operation of a vehicle.

It is still another object of the present invention to provide a device which enables vehicle fleet owners to reduce their insurance expenses.

Other objects and advantages of the present invention will become apparent to those of skill in the art upon contemplation of the disclosure herein in conjunction with the drawings.

SUMMARY OF THE INVENTION

According to the instant invention, an unsafe driving condition recorder is provided, which comprises a timer equipped processor having one or more information inputs. The processor has an output coupled to an information storage unit, which depending upon its configuration, has means for retrieval of recorded information. The processor inputs are coupled to signal sources which provide signals indicative of monitored vehicle operation variables, at least one of such variables being vehicle speed. The signal input is routed through the processor which is adapted to selectively transmit the information to the storage unit. The processor further has an operator alerting output line coupled to an unsafe condition indicator which is within the easy perception of the vehicle operator. The processor energizes the operator alerting output when the input signal exceeds a predetermined safe value, and upon elapse of a predetermined time, if the input signal has not receded below the predetermined value, initiates accumulation by the storage unit of information pertaining to one or more of the monitored vehicle operating variables for later review and analysis.

BRIEF DESCRIPTION OF THE DRAWINGS

In the drawings, wherein the same number indicates the same element throughout the several views.

DESCRIPTION OF THE PREFERRED EMBODIMENTS

Figure 1:
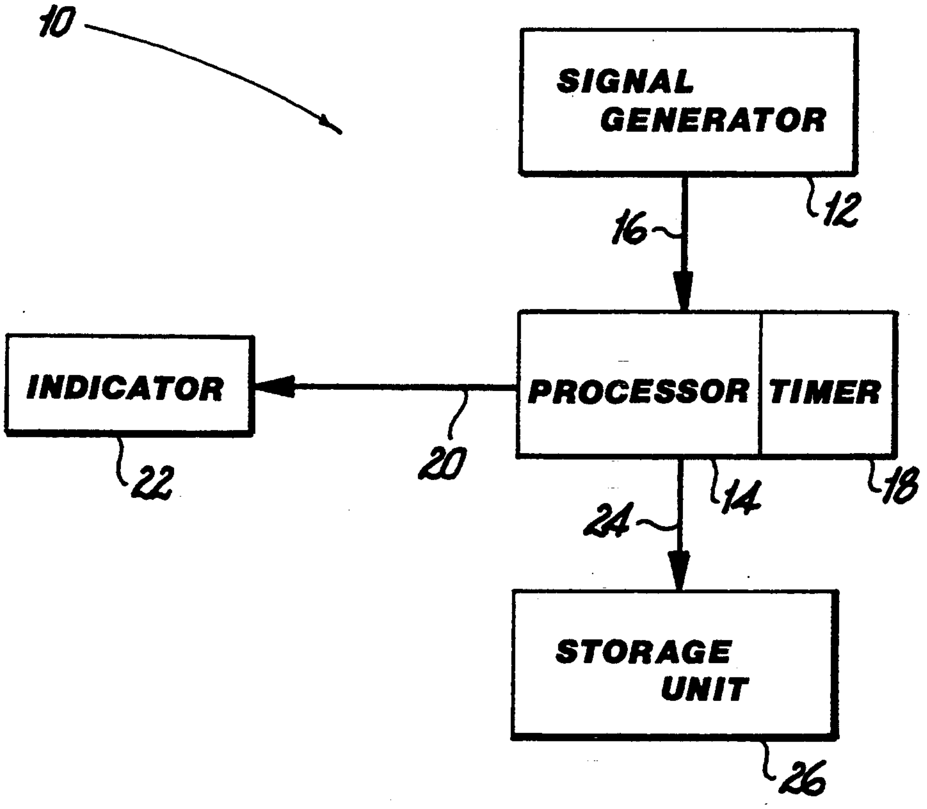
FIG. 1 is a block diagram of a basic embodiment of the automotive unsafe condition recorder of the instant invention.

The block diagram of FIG. 1 illustrates a basic embodiment of the unsafe driving condition recorder 10 of the instant invention. The device is intended to be fitted to a vehicle such as an automobile, truck, bus, motorcycle or the like. Therein is at least one sensor or signal generator 12 which generates a signal indicative of vehicle speed. The output signal from speed signal generator 12 may indicate the actual speed of the vehicle, or in simpler configurations, may simply indicate whether the vehicle speed is above or below a predetermined or maximum safe value. A processor 14 is coupled responsively to speed signal generator 12 by means of a line to processor signal input 16. Processor 14 includes clock 18 which provides means for determining elapsed time. In addition, processor 14 has an operator alerting output 20 which is coupled to and adapted to energize indicator 22. Indicator 22 may be a light or a sound emitting device, located for easy perception by the operator of the vehicle when energized. Processor 14 is further provided with an information output 24, which is in turn coupled to a storage unit 26. The storage unit 26 is adapted to accumulate and store for later review and analysis, information pertaining to one or more predefined unsafe driving conditions, which processor 14 is adapted to transfer or transmit. At least one of such unsafe driving conditions is prolonged excessive speed.

It will be appreciated by those of skill in the art that the above elements may be implemented in a variety of forms, from simple to complex, with corresponding variations in fabrication expense and the amount and detail of information monitored and stored, without departing from the spirit and scope of the instant invention.

Figure 2:
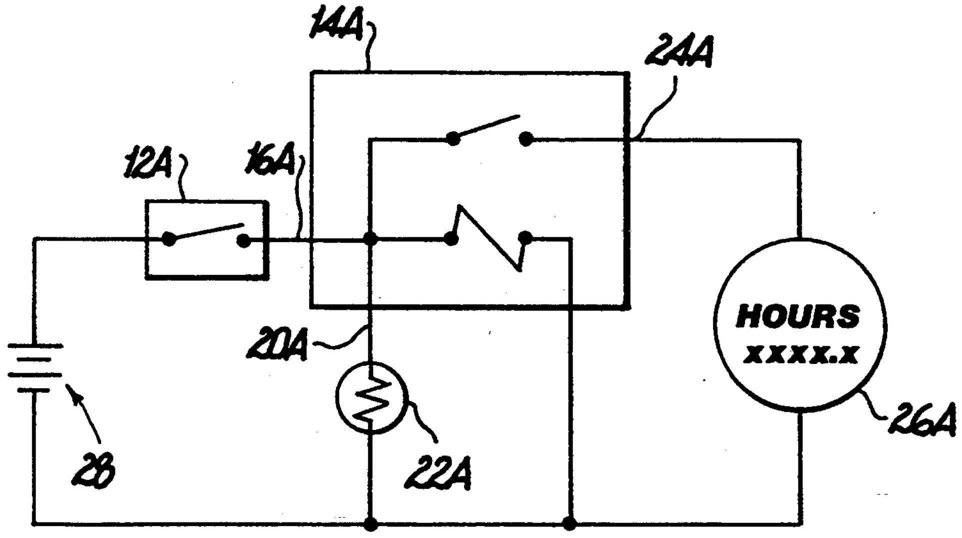
FIG. 2 is a schematic diagram of a basic embodiment of the instant invention.

Turning now to FIG. 2, a schematic diagram is shown for a very simple and inexpensive embodiment of the instant invention. Speed signal generator 12 of FIG. 1 corresponds to contacts 12a of FIG. 2, which in their most simple form are contemplated as being adapted to be triggered by the position of the vehicle's speedometer needle. This can be accomplished by a microswitch, or appropriate well known circuitry in conjunction with optical, magnetic or capacitive sensors. The contacts 12a provide a voltage level to the circuitry of recorder 10 whenever the needle passes a predetermined location. This location would correspond to a particular speed, for example, the most common speed limit, or the maximum national speed limit, that is, 55 M.P.H. or 65 M.P.H., respectively. To reduce the potential for defeating the function of the instant invention, components thereof not necessarily located elsewhere should be within an enclosure which is tamper resistant or tamper evident, or both. Power source 28 for operating the circuitry of the instant invention may be independent, or shared from the vehicle battery. In such an embodiment, processor 14 inexpensively takes the form of a time delay relay 14a, in turn coupled to selectively enable counting by elapsed timer 26a, which corresponds to storage unit 26 of FIG. 1. Depending upon the construction of time delay relay 14a chosen, the mechanism or circuitry providing for the delay in the relay corresponds to timer 18 of FIG. 1. The circuit of FIG. 2 employs a simple lamp 22a in view of the driver as indicator 22 of FIG. 1, such that processor input 16 is the same node as operator alerting output 20.

Thus in this simple embodiment, only prolonged excessive speed is contemplated as the unsafe driving condition to be monitored, and cumulative elapsed time above the predefined maximum safe speed is the operating parameter or variable to be stored. In operation, as the vehicle exceeds the predetermined speed, the speedometer needle position triggers closure of contacts 12a, simultaneously energizing the coil of relay 14*a* and operator alerting output 20*a*. Alerting output 20*a* causes indicator lamp 22*a* to light, warning of the unsafe driving condition and calling the operator's attention to the impending memorialization of the event. If the operator corrects the unsafe driving condition before elapse of the delay time of relay 14*a*, in this case by slowing down, the operator's momentary indiscretion or inattention will be, in effect, forgiven. Conversely, if the operator does not reduce the vehicle speed sufficiently before expiration of the delay time of relay 14*a*, the contacts of relay 14*a* will close, energizing output 24*a*, causing elapsed timer 26*a* to begin accumulating time until the vehicle speed is sufficiently reduced.

Relay 14*a* is selected according to the delay desired between the time the relay coil is energized and the time the contacts of relay 14*a* close, and is contemplated to give the operator a reasonable opportunity to correct the vehicle's speed, or complete a passing maneuver. Relays having delay times between ten seconds and two minutes are at the time of this writing deemed to be most useful and appropriate, although these values may be further varied according to the application.

The delay between the time of onset of this predefined unsafe condition and initiation of information accumulation constitutes a "grace period" within which a vehicle operator can correct the condition. The consequences of this grace period is to give the vehicle operator control of accumulation of information, so as to minimize the "Big Brother" effect that many drivers would likely find objectionable. In fact, such a system may even be deemed desirable by many drivers, insofar as they will be alerted to circumstances which would subject them to traffic summonses if observed by police.

Additional contact sets 12*a* may be integrated in the device to be triggered at progressively higher speeds, which would in turn, trigger additional time delay relays having delay times of progressively shorter durations, thus giving lesser grace periods for increasingly unsafe conditions. Accordingly, additional operator alerting outputs and indicators may be used to indicate the varying seriousness of the unsafe condition.

Figure 3:
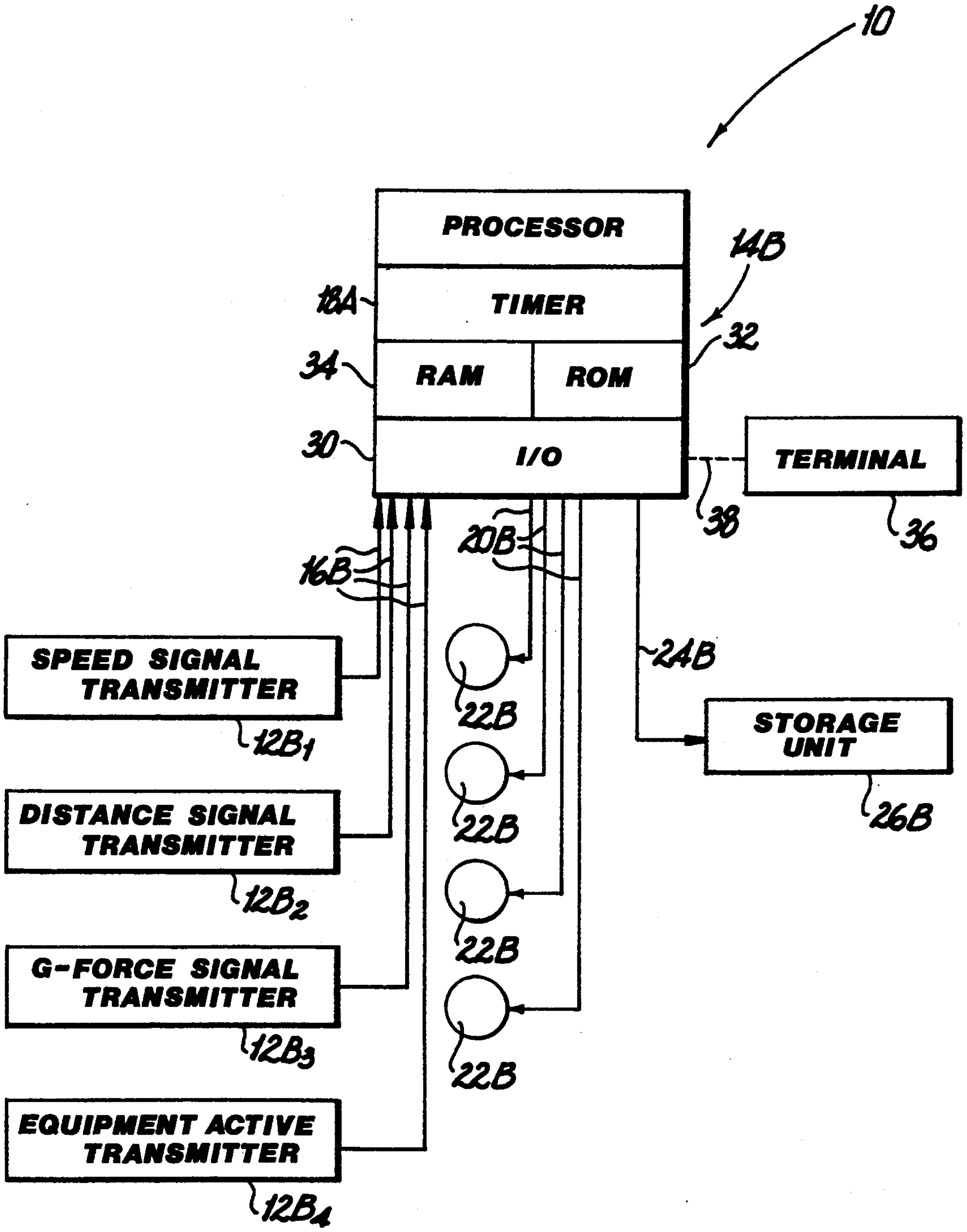
FIG. 3 is a block diagram of an embodiment of the instant invention, as equipped with a microcontroller multiple input data acquisition and monitoring unit.

Turning now to FIG. 3, a more complex embodiment of the instant invention is shown, which utilizes microprocessor 14*b*. While an equivalent device to that of FIG. 3 may also be fashioned from discrete circuit elements, the use of a microprocessor is deemed desirable at the time of this writing, because these microprocessors have recently become increasingly sophisticated and reliable, as well as inexpensive and plentiful. Not only do these processors comprise microprocessors, but within the same integrated circuit, they may also comprise analog to digital input converters, serial and parallel input and output channels, read only memory, and random access memory. Because of their greatly expanded abilities, these types of microprocessors are commonly referred to as microcontrollers, and this is the type of device which is contemplated by FIG. 3.

In the diagram of FIG. 3, the processor has an input and output signal interface, which is shown as sub block 30 of processor 14*b*. Input and output interface 30 provides for the input of information to processor 14*b* from input signal generators 12*b*, via input lines 16*b*. I/O interface 30 also provides for the output of information from processor 14*b* to output indicators 22*b* and storage unit 26*b*. Interface 30 should also provide for connection and communication with optional external terminal 36, whereby stored information may be retrieved from storage unit 26*b*, via terminal I/O line 38. In such a case, information line 24*b* would be bidirectional, although alternative provisions may be made for connection of terminal 36 directly to storage unit 26*b*.

Consequently, multiple input signal generators 12*b* of varying output signal type are shown coupled to processor 14*b*, via input lines 16*b*, so that multiple vehicle operating variables may be monitored. Thus, according to the programming stored in the ROM 32, a variety of unsafe vehicle operating conditions may be predefined and simultaneously monitored for their occurrence. As above, should a predefined unsafe condition occur, an appropriate output indicator 22*b* will then be energized via its corresponding output line 20*b* for a predetermined grace period. Again, if the unsafe condition is not corrected before elapse of the grace period, information pertaining to the occurrence will be transferred to storage unit 26*b*.

A variety of methods for determining vehicle speed may be chosen from. For example, a signal may be taken from a signal generator or source already existing in the vehicle, such as digital or electronic speedometers, or wheel speed sensor systems in anti lock brake equipped vehicles. Alternatively, vehicles may be retrofitted with components from such systems which generate such signals, or with other well known magnetic or optical sensors in conjunction with pulse generating rings installed on driveline or other components which rotate at a rate proportional to vehicle speed. Examples of such driveline components include the transmission tailshaft, driveshaft, axle, transaxle, road wheels, brake rotors or drums, or the like. In the case of retrofitted vehicle speed sensors, these can be easily calibrated by motoring the wheels at a known circumferential speed.

Ideally, using multiple speed sensors 12*b*1, the speed of each of the vehicle's wheels would be monitored in the same manner as traction control systems and antilock brake systems, so that detection of gross speed variation between wheels is enabled, which in turn, would correspond to conditions of extreme braking or acceleration. These may constitute additional unsafe conditions to be monitored, and recorded if uncorrected after warning the operator of their existence.

As mentioned above, when the instant invention is equipped with microcontroller type processor 14*b*, monitoring of multiple channels of input information from multiple signal generators 12*b* is possible, and an increased number of unsafe driving conditions may be predefined and detected. In this example, input signal generators include G force transmitters 12*b*3, such as laterally or longitudinally oriented accelerometers, or both, so that the system can detect and alert the operator to conditions approaching those where the vehicle's tires would be pushed beyond their limits of adhesion, and a vehicle slide, skid, or other loss of control would result. Again, varying degrees of unsafe driving conditions may be predefined in terms of acceleration forces, either alone or in conjunction with other operating parameters, and correspondingly varying grace periods and warning scenarios implemented before initiating storage of the monitored vehicle operation variables. Furthermore, since most vehicles cannot attain forces above 1 g under their own power, under normal driving conditions, a signal level above such a magnitude would indicate external origin of the forces, i.e. collision.

Also included in the embodiment shown in FIG. 3 are distance signal transmitters 12*b*2, which may take the form ultrasonic ranging and proximity detecting devices, directed outwardly and located around the vehicle to monitor the distance to surrounding objects or vehicles, and when monitored in conjunction with speed, to indicate tailgating. Again, according to the speeds or accelerations and distances sensed, varying degrees of tailgating or unsafe proximity may be established, and correspondingly varying grace periods implemented.

The embodiment of FIG. 3 also ideally includes input signal generator **12*b*4, which indicates active usage of one or more items of the vehicle's equipment. Such monitored equipment may include seat belts, windshield wipers, headlights, steering wheel position, throttle position, directional indicators, and the like. Information thereby provided may be merely be used for storage upon the uncorrected occurrence of an unsafe condition, or these variables may be used in conjunction with additional programming in ROM 32 and input signal generators 12*b*** such as ambient light and or moisture detectors to define additional unsafe conditions, such as operation in darkness without headlights, operation in precipitation without wipers, and the like. The input sensors used to detect such conditions would include photocells for ambient light detection, moisture sensors such as those from automatic sprinkler systems to detect precipitation, feedback potentiometers for vehicle component positions, or mere connection to existing vehicular circuitry to indicate use status of items such as headlights, wipers, seat belts, and the like.

Since the embodiment of FIG. 3 is able to monitor a variety of operating parameters for detection of more than one predefined unsafe driving conditions, it is equipped with multiple indicators **22*b*, coupled to alerting outputs 20*b*, each indicating a different unsafe driving condition or necessary corrective action, so that the vehicle operator is alerted to both the existence of an unsafe driving condition, and the nature of the unsafe condition so that it may be identified and corrected more quickly by the vehicle operator. Legends may be placed over indicators 22*b* to better implement this where they take the form of indicator lamps. Where the implementation of the instant invention provides for varying grace periods, the period may also be communicated to the driver by pulsing of indicators 22*b***, varying the frequency of the pulsing, for example, increasingly faster pulsing indicating increasingly less grace period remaining.

It should be noted that recorder 10 of FIG. 3 may employ more or less than four input signal generators and indicators, and that four has been chosen as an illustrative number only.

An additional advantage of the microcontroller equipped embodiment of FIG. 3 is the inclusion of random access memory 34, which can be used as a buffer for temporary storage of monitored input information, thus creating a short vehicle operation history. This, in conjunction with the multiple input capacity of the device, can be used to monitor one or more additional input signals or combinations thereof which would correspond to the actual occurrence of a catastrophic event such as a crash. A crash or collision can be detected as described above using G force sensors, or by coupling an input channel to airbag deployment circuitry found in many new vehicles. Alternatively, relatively severe collisions can be detected by devices such as microswitches or fragile conductive tape strips, disposed across adjacent body or structural components of the vehicle, so that changed continuity of the device would indicate changed alignment of the vehicle structure, and thus the occurrence of a collision.

Upon the occurrence and detection of such a catastrophic event, the operation history stored in RAM 34 would be transferred to storage unit **26*b* so that the operating variables in the time period before occurrence of the catastrophic event would be memorialized for crash analysis and accident reconstruction and liability determination, in much the same way as an aircraft flight recorder. This should be distinguished from normal recording operation of the instant invention, where only the input conditions during the uncorrected unsafe driving condition, and perhaps a time and date stamp, would be recorded. Accordingly, the storage unit 26*b*, which is coupled to processor 14*b* via line 24*b*, may take the form of a magnetic or optical disk drive, tape, or card, or non volatile integrated circuit memory, the latter being deemed preferable at the time of this writing for lack of moving parts more subject to failure from the vibrations associated with an automotive environment. Information stored therein may be retrieved by removal of the storage unit or its media, or alternatively by a data terminal connected via cable to the input output interface 30 of processor 14*b***.

The enhanced embodiment shown in FIG. 3 can be equipped for the monitoring of different or additional operating variables and input sensors contemplated for monitoring with the instant invention. These may also include vehicle pitch to indicate vehicle overloading or inadequate or failing suspension components.

Consequently, it will be clear to those of skill in the art that while primary function of the instant invention is the monitoring of vehicle operating variables for detection of one or more unsafe operating conditions, alerting the operator to the existence of the unsafe condition, and storage for later review of information pertaining to the unsafe condition if not corrected in a reasonable time, it is also useful for numerous applications in addition to the primary use, which include crash analysis and reconstruction, driving habit analysis, and vehicle structure analysis. Accordingly, while the above description contains many specificities, these should not be construed as limitations of the scope of the instant invention, but rather as exemplifications of the preferred embodiments thereof. Thus, the scope of the instant invention should not be determined by the embodiments shown, but rather by the claims appended hereto, and their legal equivalents.

What is claimed is:

1. An automotive recorder for use with a motor vehicle comprising:

one or more sensors adapted to transmit a signal indicative of a safety related vehicle operation variable, one of said one or more sensors being adapted to transmit a signal indicative of vehicle speed;

a processor having one or more inputs, a timer, an operator alerting output, and an information output, the one or more processor inputs being coupled responsively to said one or more sensors;

an indicator coupled responsively to the operator alerting output of said processor, said indicator being located for easy perception by an operator of the vehicle when the operator alerting output of said processor is energized; and a storage unit coupled to the information output of said processor, said storage unit being substantially non volatile and adapted to receive and accumulate information transmitted from the information output of said processor for review by a monitoring authority after an operation episode;

said processor being adapted to energize the operator alerting output when the signal from one of said sensor exceeds a predetermined value corresponding to a predefined maximum safe vehicle operating condition, the timer being adapted to trigger said processor to automatically and beyond the control of the vehicle operator transmit information from the information output to said storage unit for review by the monitoring authority after the vehicle operation episode when a predetermined time elapses from the time of energization of the operator alerting output and the signal from said sensor has not receded below the predetermined value.

2. The automotive recorder as set forth in claim 1, wherein said processor is a microcontroller, and further comprising read only memory and an input and output signal interface, said read only memory being adapted for storage of program information for the operation of said recorder, and said input and output signal interface being coupled and adapted to carry signals between said processor and said one or more sensors, said indicator, and said storage unit.

3. The automotive recorder as set forth in claim 2, wherein said sensors further include a distance signal transmitter, adapted to detect the proximity of other objects to the vehicle and transmit to said processor a signal indicative of said proximity.

4. The automotive recorder as set forth in claim 2, wherein said sensors further include a g force signal transmitter, adapted to detect the forces of lateral or longitudinal or both accelerations upon the vehicle and transmit to said processor a signal indicative of said forces.

5. The automotive recorder as set forth in claim 2, wherein said sensors additionally include means for detecting collision of the vehicle, and said processor further comprising random access memory adapted to accumulate the information from said sensors to form a vehicle operation history, and the read only memory is adapted to control said processor to transfer the vehicle operation history to said storage unit for preservation upon detection of a collision.

6. The automotive recorder as set forth in claim 2, wherein said input and output signal interface further comprises means for connection to an external data terminal, and said processor is adapted to communicate information from said storage unit to the external data terminal.

7. A method for encouraging safe motor vehicle operation comprising the steps of:

equipping a motor vehicle with sensor means for detecting one or more unsafe operation conditions thereof, means responsive to the detection of an unsafe operation condition for indicating to a vehicle operator the existence of said unsafe operation condition, and time delay means for a substantially non volatile storing, beyond the control of the vehicle operator, of information pertaining to the unsafe operation condition if the unsafe operation condition remains uncorrected after indicating the existence thereof to the operator;

monitoring the sensor means for the detection of said unsafe operation condition;

energizing an indicating means to alert the operator upon detection of said unsafe operation condition;

allowing a predetermined period of time for correction of the unsafe operation condition to elapse after energizing the indicating means;

automatically storing for review by a monitoring authority after a vehicle operation episode, information pertaining to the unsafe vehicle operation condition, if the detected unsafe operation condition is not corrected during the allowed predetermined period of time after energizing the indicating means.

* * * * *